No. 710,404. Patented Oct. 7, 1902.
C. A. BARTLIFF.
METHOD OF TREATING AIR FOR FORCING MALT LIQUORS FROM KEGS.
(Application filed Apr. 20, 1901.)
(No Model.)
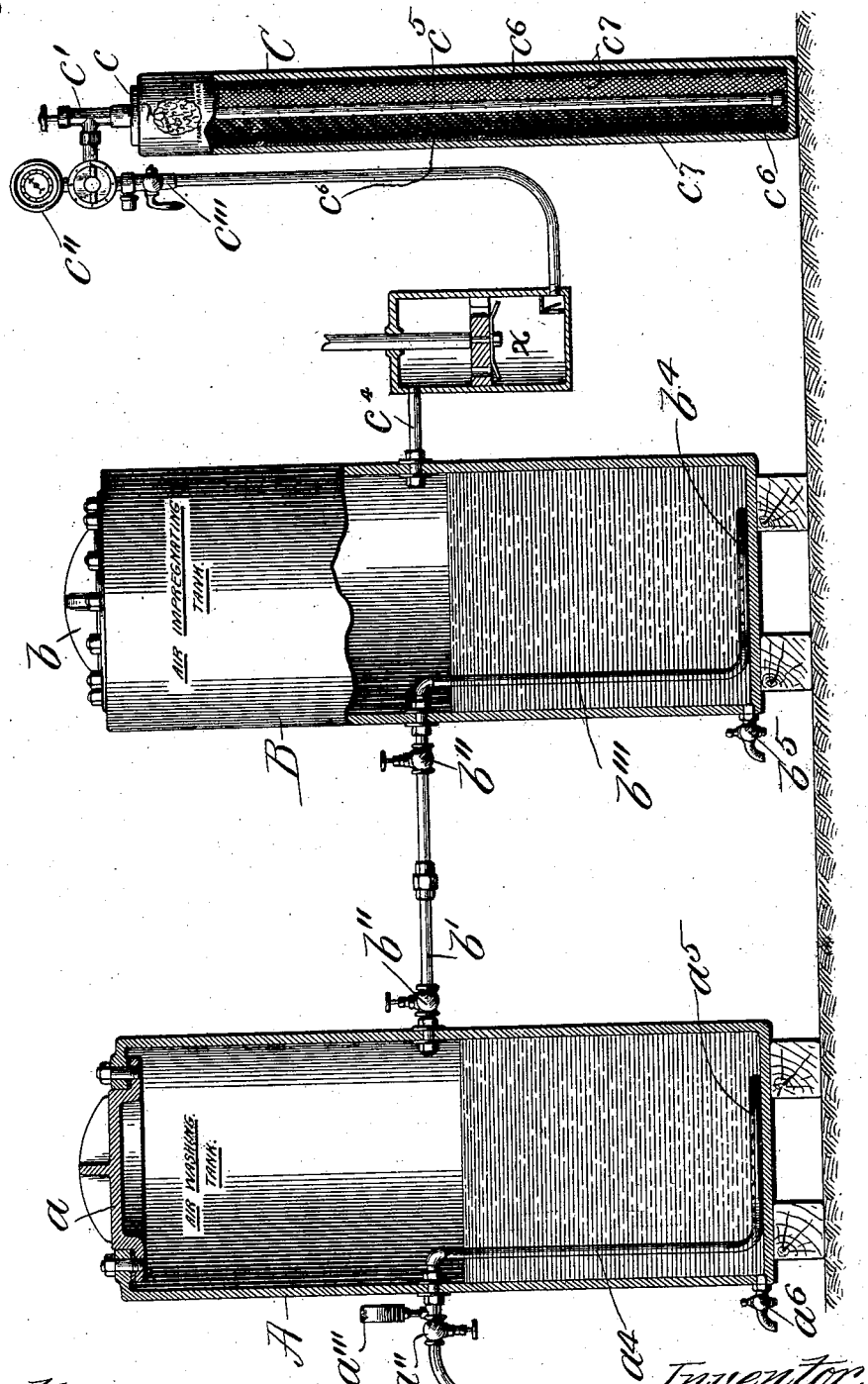

UNITED STATES PATENT OFFICE.

CHARLES A. BARTLIFF, OF ST. LOUIS, MISSOURI.

METHOD OF TREATING AIR FOR FORCING MALT LIQUORS FROM KEGS.

SPECIFICATION forming part of Letters Patent No. 710,404, dated October 7, 1902.

Application filed April 20, 1901. Serial No. 56,696. (No model.)

*To all whom it may concern:*

Be it known that I, CHARLES A. BARTLIFF, a subject of the King of Great Britain, residing at the city of St. Louis, in the State of Missouri, have invented a certain new and useful Improvement in Methods of Treating Air for Forcing Malt Liquors from Kegs, of which the following is a full, clear, and exact description, such as will enable others skilled in the art to which it appertains to make and use the same, reference being had to the accompanying drawings, forming part of this specification.

This invention relates to a new and useful improvement in a method of treating air for use in forcing malt liquors from kegs, which consists in compressing and impregnating air with hops for use in connection with a draft-beer apparatus, the impregnated compressed-hop air being employed substantially in the same manner as carbonic-acid gas is now most generally used, with this exception that it is held in contact with a solution of hops in the portable tank, whereby it may absorb its full quota of hops. Hops is an ingredient largely used in the manufacture of the finer grades of beer, giving to the beer its palatable flavor. When the beer is sold in kegs or barrels to customers and drawn off, several methods may be used to exert pressure on the surface of the beer in the keg or barrel to force the beer through the pipes. Manually-operated and water pumps have been used for this purpose, as well as tanks containing compressed carbonic-acid gas. I propose compressing air impregnated with hops in a tank of convenient size for use, so that when the impregnated hop-air is introduced under pressure upon the surface of the beer in the keg or barrel it will act not only as a natural preservative for the beer with which it is in contact, but will impart, to a great extent, to a poor quality of beer the flavor of a fine grade of beer. My system contemplates the purification of air to be used by washing or otherwise, the purified air being then placed in contact with a strong hop solution, so that the air will absorb and retain in suspension a large percentage of hops, the air thus impregnated with hops being introduced into a suitable tank for commercial purposes, where it is held in contact with a solution of hops to maintain its strength. The air may be compressed before being introduced into the washing-tank, or the air may be first washed and purified and then compressed and impregnated, or the air may be washed and impregnated and finally compressed before it is introduced into the tank. In the accompanying drawings I have shown the latter—that is, the impregnated air is compressed by the compressor marked X before it is introduced into the tank. In order to preserve the strength of the impregnated compressed air in the tank, I preferably arrange a felt or other absorbent lining in said tank for the purpose of collecting the condensed moisture from the air, which moisture condenses under certain conditions, and when conditions are favorable for the evaporation of such moisture the absorbent material by capillary attraction distributes the moisture over a large area, so that it is in the best available shape for absorption by the air. Where the air is heavily impregnated with the hop solution before introduction into the tank, the felt or absorbent material in the tank may be dry before the introduction of the hop-air; but in order to increase the percentage of hop in the air drawn from the tank a strong solution of hops may be introduced into the tank and then poured out, so as to thoroughly saturate the absorbent material in the tank. When the hop-air is introduced into the tank under these conditions, if the air is not impregnated to its full capacity upon being introduced into the tank it will absorb hops from the absorbent material in the tank. Thus the absorptive properties of the air in the tank are taxed at all times to their fullest extent, and when the air is drawn from the tank it contains the greatest possible quantity of hops. In this respect pressure and temperature affect the hygrometric properties of the air, it being, of course, the object to have the greatest percentage of humidity at all times.

In the drawings I have shown an apparatus for use in practicing my improved method of treating air for forcing malt liquors from kegs; but it is obvious that there are, perhaps, other apparatus which could be used for the same purpose. I will now describe the apparatus shown.

A indicates a vessel preferably closed by a cover $a$, said vessel containing water or other suitable liquid for washing the air to be used. The air passes through pipe $a'$, its passage therethrough being controlled by a valve $a''$. A pressure-gage $a'''$ is preferably used, for well-understood reasons. A pipe $a^4$ extends down to the bottom of the vessel A, terminating in a perforated coil $a^5$, through the openings in which the air is forced to pass in a divided state, so that practically all of its particles are subjected to contact with the liquid in the vessel. A cock $a^6$ is arranged in the bottom of the vessel for carrying off the impurities collected by the liquid.

B indicates a vessel containing a strong solution of hops. This vessel is closed by a cap or cover $b$ and is connected by a pipe $b'$ to the air-space above the liquid in vessel A. This pipe $b'$ contains a convenient coupling by which the vessels may be disconnected from each other, and on each side of the coupling are arranged valves $b''$ for obvious purposes. A pipe $b'''$ extends downwardly in the vessel, said pipe terminating at a perforated coil $b^4$, through the openings in which the purified air passes in a finely-divided state, contacting with the hops solution in the vessel B, absorbing the hops from said solution. A cock $b^5$ is arranged in the bottom of vessel B for drawing off the hop solution when desired. It is obvious that the air in passing through the cleansing liquid in vessel A will absorb more or less moisture therefrom, and to the extent of such absorption it is incapable of taking up a corresponding quantity of hops. I may, therefore, use a hop solution in the vessel A, which will act as a cleansing agent and at the same time impregnate the air with the hops, or I may use some non-volatile liquid in vessel A. When the air is impregnated with hops, it is drawn off from the vessel B, compressed by a compressor X, after which it passes into a suitable reservoir, (not shown,) if desired, and into a tank C through suitable pipes. This tank preferably has a cover $c$. A T-coupling $c'$, containing a needle-valve, is arranged in this cover, into which T-coupling leads a pipe $c^4$. A pressure-gage $c''$ is provided, as is also a valve $c'''$, for obvious purposes. A perforated pipe $c^5$ extends through the tank C in order that when the impregnated compressed air is introduced into the tank and withdrawn therefrom it will be over an extended area. Tank C is lined with felt $c^6$ or other absorbent material, which is held against the walls thereof by wire-gauze or other suitable material $c^7$. When the impregnated hop-air is introduced into the tank lined with this absorbent material, it is obvious that the condensed moisture will be taken up by the absorbent material and distributed over an extended area. It is well known that moisture condensed from gases upon any non-absorbent surface will collect in drops and in this state is not so susceptible of evaporation and reabsorption by the gases. I therefore prefer to employ the absorbent material to prevent the collection of moisture in drops or bodies of liquid. As the temperature of the air and the pressure in the tank affect the condensation of the moisture carried by the compressed air, which moisture when condensed, by reason of the static condition of the air in the tank, is not in a favorable condition to be again evaporated and reabsorbed by the air, I prefer to thoroughly saturate the absorbent material with the hop solution before the air is introduced into the tank. In addition to this I may introduce a small quantity of liquid hop solution in the bottom of the tank, so as to keep the absorbent material saturated at all times in the event that the air absorbs moisture therefrom. Thus, if the avidity of the absorbent material for absorbing moisture is satisfied, the air will be permitted to retain its full quota of moisture, and if the hygrometric conditions of the air are such that it is capable of holding more moisture in suspension such additional moisture will be supplied from the quantity contained in the absorbent material. When the proper pressure is reached in the tank C, the valve in the coupling $c'$ is closed and the tank disconnected. The tank is now ready to use. In using, it is connected by a suitable pipe to the space above the beer in the keg or barrel, its pressure being exerted on the surface of the beer, forcing the beer through the cooling-pipes or other apparatus. The hops in the compressed air not only tends to preserve the beer, but as the beer is usually kept cool, the hop solution in the air is liable to condensation when contacting with the cool beer, and thus imparts to the beer a good flavor; or, if the beer is flavored with hops, a finer flavor.

The word "air" used herein is intended to mean natural air, as distinguished from air mixed with other recognized gases, said gases being present to an appreciable extent.

Having thus described my invention, what I claim, and desire to secure by Letters Patent, is—

1. The method of treating air for use in forcing malt liquors from kegs, which consists in heavily impregnating said air with hops, compressing the same and maintaining the same in a compressed condition in contact with a preparation of hops, substantially as described.

2. The method of treating air for use in forcing malt liquors from kegs, which consists in heavily impregnating said air with hops, compressing the same, and storing the air while compressed in a suitable receptacle having a solution of hops, where it remains in contact with hops until drawn from said receptacle for use; substantially as described.

3. The method of treating air for use in forcing malt liquor from kegs, the same consisting, first in purifying the air, then heavily impregnating it with hops, finally compressing the purified and impregnated air and storing the same in a compressed condition in a receptacle containing a solution of hops, whereby, the strength of the hops in the air is maintained; substantially as described.

In testimony whereof I hereunto affix my signature, in the presence of two witnesses, this 18th day of April, 1901.

CHARLES A. BARTLIFF.

Witnesses:
GEORGE BAKEWELL,
ANNA S. GRAY.